United States Patent [19]

Leiber

[11] Patent Number: 4,568,130

[45] Date of Patent: Feb. 4, 1986

[54] VEHICLE WHEEL CONTROLLED ANTI-BRAKE LOCK BRAKING SYSTEM

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 620,458

[22] Filed: Jun. 14, 1984

[30] Foreign Application Priority Data

Jun. 14, 1983 [DE] Fed. Rep. of Germany .. 3321376
Oct. 29, 1983 [DE] Fed. Rep. of Germany .. 3339335

[51] Int. Cl.$^4$ .............................................. B60T 8/10
[52] U.S. Cl. ...................................... 303/92; 303/110; 303/114
[58] Field of Search ................. 303/92, 93, 95, 100, 303/105, 110, 111, 113, 114, 116, 119

[56] References Cited

U.S. PATENT DOCUMENTS

| | | | |
|---|---|---|---|
| 3,999,809 | 12/1976 | Inada et al. | 303/100 |
| 4,093,317 | 6/1978 | Lindemann et al. | 303/111 |
| 4,099,793 | 7/1978 | Iio | 303/119 X |
| 4,320,459 | 3/1982 | Lindemann et al. | 303/111 X |
| 4,415,210 | 11/1983 | Belart | 303/116 |
| 4,460,220 | 7/1984 | Petersen | 303/111 X |
| 4,492,413 | 1/1985 | Belart | 303/92 |
| 4,523,791 | 6/1985 | Belart et al. | 303/92 |

Primary Examiner—Duane A. Reger
Attorney, Agent, or Firm—Frishauf, Holtz, Goodman & Woodward

[57] ABSTRACT

To prevent loss of brake fluid in a closed brake fluid circuit including an automatic brake anti-lock system having an automatic brake anti-lock evaluation stage (ABS), and brake fluid control valves (9–12; 40–42) controllable by the ABS stage for pressure build-up, pressure maintenance, and pressure drop, respectively, a feed valve (15, 43) is provided coupled to a source (6, 8) of pressurized brake fluid, preferably to a pilot valve which is operated by the operator brake pedal in a pilot valve chamber (6), the feed valve being hydraulically operatively connected to the pressure inlet connections of the control valve means, the feed valve being electrically connected to the ABS evaluation stage and operated, upon energization thereof, to supply pressurized brake fluid when the ABS unit responds, indicative of skidding or incipient locking of a brake. A hydraulic choke (15a, 43a) is interposed in the connection between the feed valve and the respective control valves (9–12; 40–42). To maintain separation of braking circuits (I, II), a distributor unit with check valves is provided so that pressurized brake fluid is separately fed to the respective brake circuits.

7 Claims, 3 Drawing Figures

VEHICLE WHEEL CONTROLLED ANTI-BRAKE LOCK BRAKING SYSTEM

Reference to related application, assigned to the assignee of the present application, the disclosure of which is hereby incorporated by reference: U.S. Ser. No. 620,466, filed June 14, 1984, LEIBER et al.

The present invention relates to a vehicle wheel anti-brake lock or anti-skid system, and more particularly to a system in which pressurized brake fluid is supplied to a hydraulic cylinder from a pressure fluid source.

BACKGROUND

Vehicle anti-brake blocking or anti-skid systems frequently use an evaluation circuit which determines of brake fluid, supplied from a pressure source, is to be admitted to the brake cylinders of vehicle brakes, to be drained from the brake cylinders, or if already pressurized brake fluid is to be maintained under existing pressure conditions. Control systems of this kind may additionally use braking pressure control valves to vary the braking pressure. A static brake fluid circuit may be present and, due to circulation of brake fluid in brake fluid circuits, excessive drainage of brake fluid in the static circuit may occur.

THE INVENTION

It is an object to provide a vehicle anti-brake blocking or vehicle wheel anti-skid system in which provisions are made to prevent exhaustion of pressurized brake fluid even if no return of brake fluid to a brake fluid circuit occurs.

Briefly, a feed valve is provided coupled to the source of pressurized brake fluid and to brake control valves, the feed valve being operatively connected to and controlled by the automatic anti-brake blocking or anti-skid evaluation stage, and supplying pressurized brake fluid to the control valves through a hydraulic choke interposed in the connection between the feed valve and the respective control valve. Preferably, the pressure at which the additional pressurized fluid through the feed valve is provided is controlled by the master cylinder itself.

The system has the advantage that the feed valve will supply pressurized brake fluid to the brake cylinders themselves, however under throttled conditions. Thus, bypass valves for rapid build-up absent control of braking pressure need not be used.

In accordance with a feature of the invention, the system is so arranged that the brake pressure control valves in one of the brake fluid circuits—assuming that two parallel brake fluid circuits are present, which is current custom for safety reasons—are not simultaneously controlled into a position which permits increase of braking pressure. This arrangement avoids balancing of differential pressures on the brakes of respective wheels.

The operating efficiency of the automatic braking system is improved in that, under automatic operation, the increase in braking pressure is slower, thus lowering the requirements of operating speed and pressure handling capabilities of the magnetic valves used in the automatic braking system, and consequently resulting in a decrease in loading thereon. Further, reduction in swings of pressure due to intermittent, pulsed operation of the valves, for example under control of a pulse-controlled braking system, known as such, is eliminated, or at least essentially reduced.

DRAWINGS

DETAILED DESCRIPTION

Figure 1:
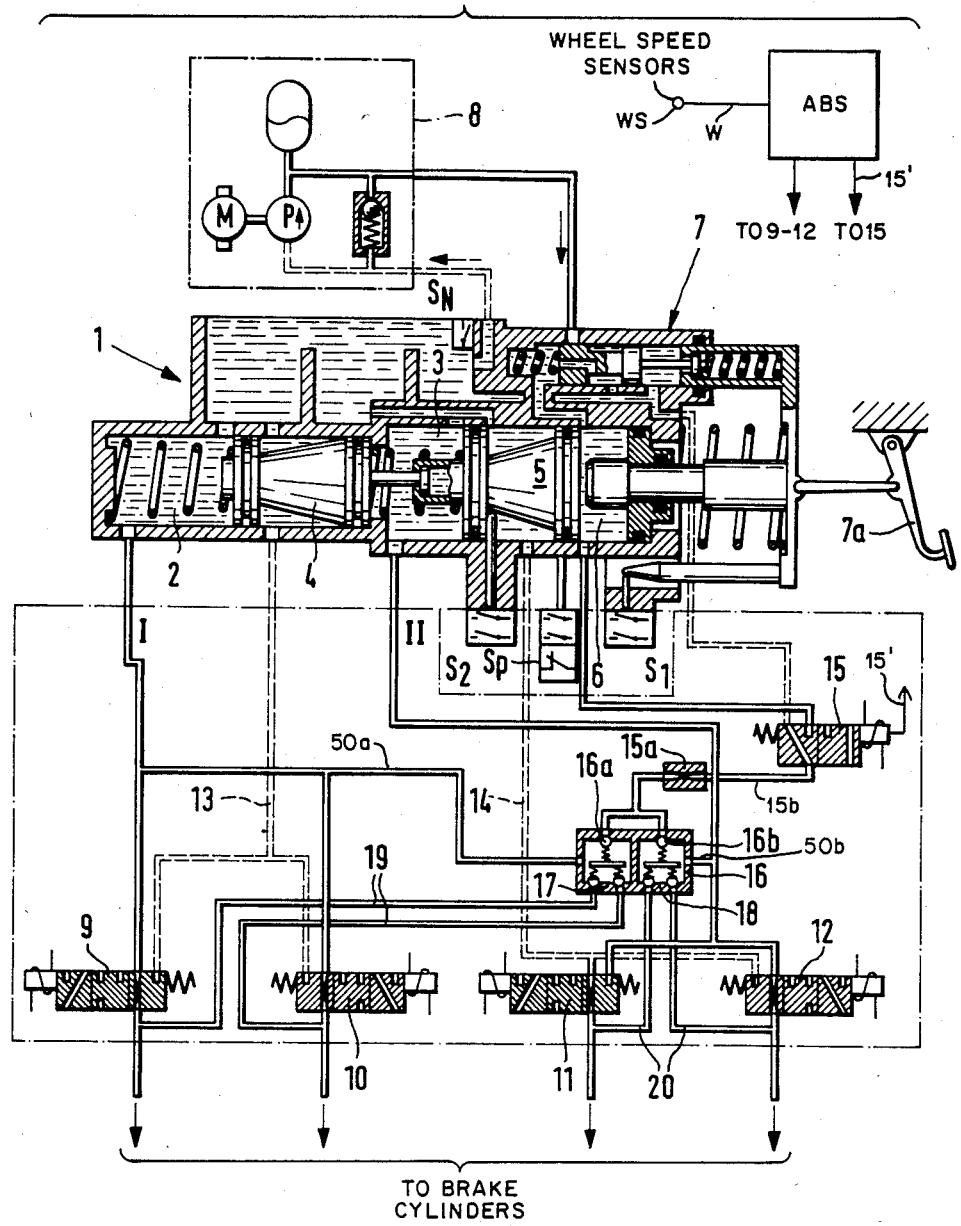
FIG. 1 is a schematic view, partly in section, of the hydraulic portion of a brake anti-blocking system in accordance with the present invention.

A power brake system 1—see FIG. 1—has two master brake cylinders 2, 3 with associated pistons 4, 5 for two braking circuits I and II. Piston 5 is connected to a pressure chamber 6 in which a hydraulic pressure level, derived from a pressure source 8, is controlled by operation of a brake pedal 7a which, in turn, operates the main brake valve 7. The pressure from source 8, which may be termed the supply pressure, acts directly on the piston 5 and indirectly on the piston 4, and generates hydraulic braking pressure in the respective braking circuits or loops I, II.

FIG. 1 shows pressure hydraulic lines in solid form and drain hydraulic lines in broken-line representation. Each one of the brake circuits I, II associated with the wheels has 3/3 magnetic valves connected therein, shown as valves 9–12. The connection is specifically shown with respect to valve 12. In one position, hydraulic pressure in the brake cylinder (not shown) of the wheel may rise; in a second position, the braking pressure is maintained constant, by isolating the previously determined braking pressure in the line between the control valve 12 and the braking cylinder, that is, the pressure does not increase and does not drop; and in a third position, the pressure can drop due to drainage over the return or drain line shown in broken-line representation.

In accordance with a feature of the invention, a feed valve 15 is provided. Feed valve 15 is a 3/2 magnetic valve, connected to the pressure chamber 6. During operation of the automatic braking system ABS, the valve 15 is opened and pressurized fluid is supplied from the pressure chamber 6 via valve 15, connecting line 15b, which has a hydraulic choke 15a interposed, to a valve block 16, from which hydraulic brake pressure is distributed via connecting lines 50a and 50b to the inlets of brakes 9, 10 and 11, 12, respectively, of the two fluid circuits I, II. The valve block 16 is a dual valve block, which includes two check valves 16a, 16b permitting only flow of pressurized brake fluid to the valves 9, 10 and 11, 12, and which isolates hydraulically and separates the two circuits I, II, preventing hydraulic interconnection thereof. The valve block 16 further includes four check valves 17, 18 which are connected in shunt or parallel lines 19, 20 of the respective fluid circuits I, II, and connected in shunt with respect to the valves 9, 10 and 11, 12, and which permit, upon drop in pressure in the chambers of the valve block 16, also drop in pressure at the output of the valves 9, 10 and 11, 12, respectively.

Operation:

In normal braking operation, the braking pressure is generated only via the main brake cylinders 2, 3. Rapid rise in brake pressure is possible.

In accordance with a feature of the invention, rapid increase in pressure can be controlled by the feed valve 15 when the ABS system is operative. Valve 15 is energized via line 15' to open the valve, so that brake fluid is additionally supplied, under throttled conditions from chamber 6 through valve 15, line 15b, throttle 15a, valve block 16 and lines 50a, 50b. Upon operation of the ABS unit, thus, the valve 15 will be open and will supply brake fluid under throttled conditions.

Figure 2:
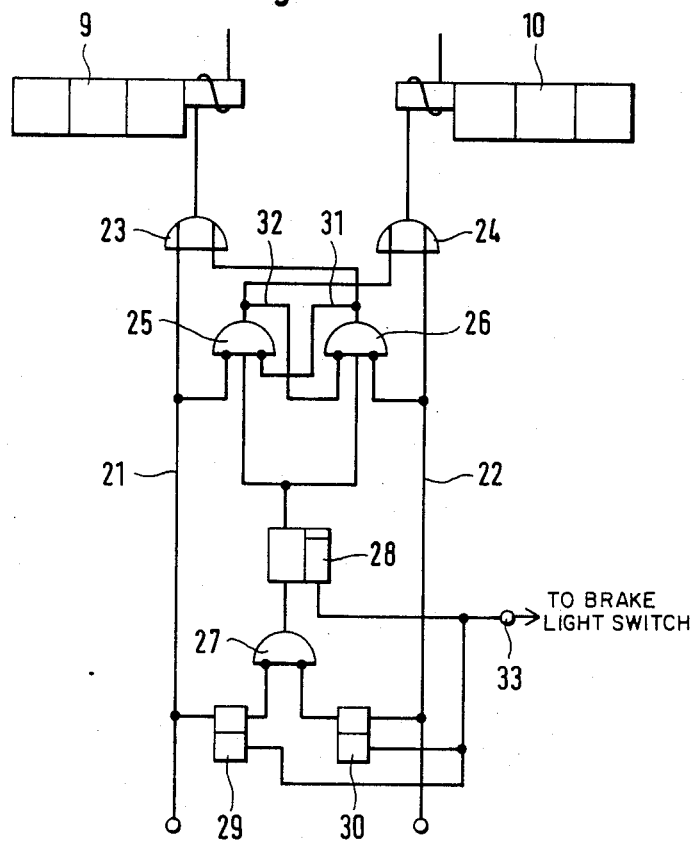
FIG. 2 is a schematic circuit diagram illustrating the electrical interconnection of braking valves in two separate braking circuits.

A circuit arrangement for valves within one brake circuit, e.g. I or II, is shown in FIG. 2. Only valves 9, 10 are illustrated since the system for valves 11, 12 can be identical. Valves 9, 10 are three-position valves and are controlled from the evaluation circuit, that is, the ABS unit, over connecting lines 21, 22. These lines may, for example, be individual lines from the arrow "To 9–12" of the ABS unit, FIG. 1. The ABS unit receives inputs from wheel speed sensors WS over a wheel speed line, carrying wheel speed signals W.

Lines 21, 22 (FIG. 2) are connected to OR-gates 23, 24 which permit, without any control signal from the ABS unit, the valves to be in the position in which brake pressure can be increased in the brake cylinders of the respective brakes to which the valves 9, 10 are hydraulically connected. Upon generation of a suitable control signal, the valves can be put into an intermediate position in which the brake line between the valves 9, 10 and the associated brake cylinders is isolated, so that the braking pressure in the wheel brake cylinder is maintained constant. If a third, and for example higher signal is applied to the solenoid coils of the magnetic valves 9, 10, the valve is placed into a third position in which the hydraulic line from the brake cylinders is connected to drain line 13 (FIG. 1) to permit drainage of pressurized fluid, and thus decrease of braking pressure. It is desirable to prevent simultaneous increase of braking pressure over both valves 9, 10. To prevent such simultaneous increase, for example if the braking circuit controls only the brakes on one side of the vehicle, AND-gates 25, 26, 27 and bistable circuits, for example flip-flops 28–30 are provided.

If pressure is controlled on both wheels of any one circuit, and thus pressure drop signals are present on both lines 21, 22, the FFs 29, 30 will change state and the input signals are thus applied to the AND-gate 27, which causes setting of the FF 28 so that a signal will be applied to AND-gates 25, 26. For the time that both lines 21,22 have control signals applied thereto, either to drain pressure or to hold pressure constant, AND-gates 25, 26 are blocked due to the inversion of the signals. Both outputs of the AND-gates 25, 26 thus will not have a signal thereon. The inverting inputs of the AND-gates 25, 26 for the crossed feedback lines 31, 32 thus will have a signal applied thereto.

If one of the signals on the lines 21, 22, for example the signal on line 21 drops out, so that pressure over valve 9 will increase, an output signal will be applied to AND-gate 25 which provides the signal to the valve 10, so that, by this signal alone, a maintenance of pressure—intermediate position of valve 10—will occur. If a signal on line 22 is present, this signal is overridden or covered. At the same time, the output signal of AND-gate 25 will block, and the AND-gate 26 will be blocked over the cross-coupled line 32. If the signal on line 22 drops out, valve 10 will be held in the intermediate position—maintenance of pressure—by the output signal from the AND-gate 25. Due to blockage of the AND-gate 26, no signal can be applied to valve 9.

Pressure increase over valve 10 is thus prevented for the period that pressure increase occurs in valve 9. When a control signal is again applied to line 21, AND-gate 25 will block, and thus the pressure maintenance signal for valve 10 is terminated. At the same time, the blockage of the AND-gate 26 over line 32 is relieved and—assuming that there is no further signal on line 22—pressure in valve 10 can increase, and a pressure maintenance signal for valve 9 can be generated by AND-gate 26. At the same time, the AND-gate 25 will block. Reset of the bistable FF 28, 29, 30 is effected at the termination of a braking cycle over terminal 33 which, for example, can be connected to the brake light switch, and, upon opening of the brake light switch, provides a reset pulse, for example over a differentiating circuit, as well known.

Figure 3:
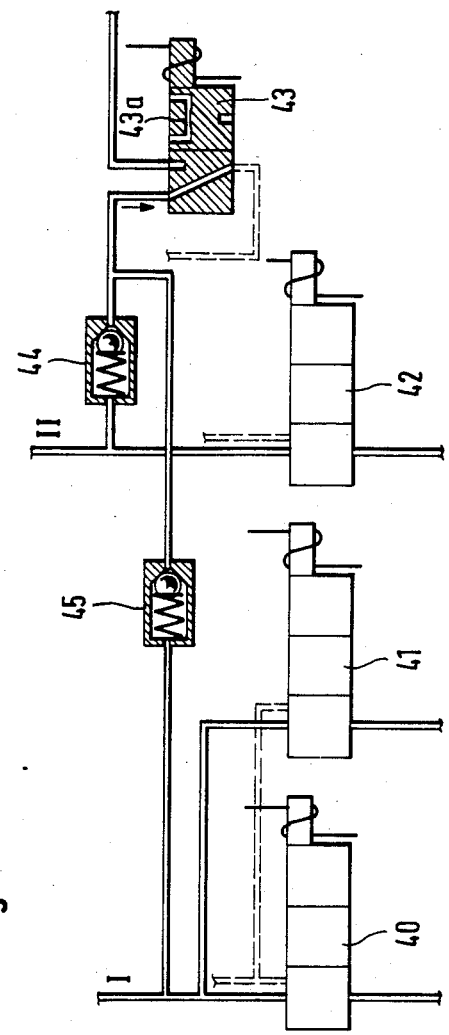
FIG. 3 illustrates a modified arrangement of valves controlling admission, blockage and drainage, respectively, of brake fluid to brake cylinders in wheel brakes of a vehicle.

FIG. 3 illustrates a simplified arrangement of the valve system. Only three brake pressure control valves 40, 41, 42 are used, for example all connected to the feed valve 43. The hydraulic choke is included within the feed valve 43, and shown therein at 43a. The output from the feed valve 43 is connected over separate check valves 44, 45 to the brake control valves 40, 41 of a brake circuit I and to a common control valve 42 of the braking circuit 42.

Various changes and modifications may be made within the scope of the inventive concept.

I claim:

1. Vehicle wheel controlled anti-brake lock braking system having
   an anti-brake lock system evaluation stage (ABS) coupled to receive wheel operation signals (W);
   a source (6, 8) of pressurized brake fluid;
   a main brake cylinder (1) having dual output brake fluid circuits (I, II) emanating therefrom, each brake fluid circuit including at least one brake fluid control valve means (9, 10; 11, 12; 40, 41, 42) controllable in at least two modes:
   (1) increase of brake fluid pressure level affecting brake fluid pressure in at least one wheel or an axle of the vehicle,
   (2) drainage of brake fluid to drop brake fluid pressure affecting at least one wheel or an axle of the vehicle,
   a feed valve (15, 43) coupled to the source (6, 8) of pressurized brake fluid and to the pressure input connections of the brake fluid control valve means (9, 10, 11, 12; 40, 41, 42), said feed valve being operatively connected to and controlled by the automatic anti-brake lock system evaluation stage (ABS) to supply pressurized brake fluid thereto;
   and a hydraulic choke (15a, 43a) interposed in the connection between the feed valve (15, 43) and the respective control valve means (9–12; 40–42);
   wherein the feed valve (15, 43) is connected to the main brake cylinder (1) to receive pressurized brake fluid therefrom,
   and the main brake cylinder is connected to receive pressurized brake fluid from said source (6, 8).

2. System according to claim 1, wherein the main brake cylinder (1) includes a pilot cylinder-piston chamber (6);
   and wherein the feed valve is connected to the cylinder chamber (6) of the pilot valve to receive pressurized brake fluid under the pressure commanded by an operator pedal (7a) connected to and operating the pilot piston-cylinder chamber (6) combination.

3. System according to claim 1, wherein at least one of the brake fluid circuits has two control valve means (9, 10; 11, 12,; 40, 41);

and wherein the automatic brake anti-lock system evaluation stage (ABS) includes an interlock circuit controlling the respective control valve means (9-12; 40-42) of said at least one brake fluid circuit to inhibit application of control signals tending to increase brake fluid pressure simultaneously to both the fluid control valve means (9, 10; 11, 12; 40, 41) of said at least one brake fluid circuit.

4. System according to claim 1, further including a separating valve arrangement (16; 16a, 16b) coupled between the feed valve and the pressure inlet connections of the valve means (9-12; 40-42) of respective brake fluid circuits to separate, hydraulically, said brake fluid circuits and to separately control increase of supply of pressurized brake fluid to the control valve means of the respective brake fluid circuits.

5. System according to claim 1, including shunt valve connection means (17, 18) coupled to the pressure outlet connections of the respective brake fluid control valve means (9-12; 40-42) and connected to permit decrease of pressure existing at the outlet or output of the respective brake fluid control valve means with respect to the pressure input connections.

6. System according to claim 5, wherein said shunt valve connection means (17, 18) are located in a valve unit block (16) including a connection from said hydraulic choke (15a, 43a) and a connection (50a, 50b) to the inlet of the brake fluid control valve means (9-12; 40-42).

7. System according to claim 5, further including a separating valve arrangement (16; 16a, 16b) coupled between the feed valve and the pressure inlet connections of the valve means (9-12; 40-42) of respective brake fluid circuits to separate, hydraulically, said brake fluid circuits and separately control increase of supply of pressurized brake fluid to the control valve means of the respective brake fluid circuits.

* * * * *